US006363600B2

(12) United States Patent
Pang

(10) Patent No.: US 6,363,600 B2
(45) **Date of Patent: *Apr. 2, 2002**

(54) METHOD OF REMOVING PHOTOSENSITIVE BELT FROM PRINTER

(75) Inventor: Jeong-hun Pang, Suwon (KR)

(73) Assignee: Samsung Electronics Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/450,735

(22) Filed: Nov. 30, 1999

(30) Foreign Application Priority Data

Dec. 29, 1998 (KR) ........................................... 98-60006

(51) Int. Cl.[7] ................................................. B23P 19/00
(52) U.S. Cl. ...................... 29/426.5; 29/426.1; 399/165
(58) Field of Search ............................ 29/426.5, 426.1; 399/162, 165; 198/807, 840

(56) References Cited

U.S. PATENT DOCUMENTS 5,479,241 A * 12/1995 Hou et al. .................. 198/807
6,052,548 A * 4/2000 Yamamoto .................. 399/162

FOREIGN PATENT DOCUMENTS

EP 0608124 A * 7/1994 ................. 399/165
EP 0 699 968 3/1996 .......... G03G/15/00

OTHER PUBLICATIONS

European Search Report dated Apr. 2, 2001.

Patent Abstracts of Japan vol. 009, No. 308 (p–410) Dec. 4, 1985 JP 60–140286 Jul. 25, 1985.

* cited by examiner

*Primary Examiner*—David P. Bryant
*Assistant Examiner*—Jermie E. Cozart
(74) *Attorney, Agent, or Firm*—Sughrue Mion, PLLC

(57) ABSTRACT

A method of removing a photosensitive belt of a printing apparatus from rollers of a belt unit. In this method, since the photosensitive belt is circulated with at least one roller slanted with respect to the others so that the photosensitive belt moves in a lengthwise direction of the rollers and part of the photosensitive belt is projected through the belt passage, and then the photosensitive belt is removed by pulling the portion projected through the belt passage, the worker can remove the photosensitive belt without a separate removing device and damage of parts in the printing apparatus and an accident due to carelessness can be fundamentally prevented.

2 Claims, 5 Drawing Sheets

METHOD OF REMOVING PHOTOSENSITIVE BELT FROM PRINTER

BACKGROUND OF THE INVENTION

1. Field of the Invention

The present invention relates to a method of removing a photosensitive belt of a printing apparatus from rollers of a belt unit for repair or replacement.

2. Description of the Related Art

In general, as shown in FIGS. 1 and 2, a printing apparatus such as a printer or copier is comprised of a frame 10 having a belt passage 11, a belt unit 20, a developing device 30, a transfer roller 41 and a fixing roller 42. The belt unit 20 includes rollers 21, 22 and 23, and a photosensitive belt 25 circulating around the rollers 21, 22 and 23.

During printing, a toner image is formed on one surface of the circulating photosensitive belt 25 by the developing device 30, the toner image is transferred and fixed on a sheet of paper 1 passing through between the transfer roller 41 and the fixing roller 42, and the image is printed on the sheet of paper 1. On the other hand, when so-called lateral slip occurs, i.e., the photosensitive belt 25 looped around the rollers 21, 22 and 23 circulates in a slightly oblique direction with respect to the rollers 21, 22 and 23 and does not circulate in a perpendicular direction with respect to the rollers 21, 22 and 23, the photosensitive belt 25 moves in a direction which increases the tension of the photosensitive belt 25 along a lengthwise direction of the rollers 21, 22 and 23, and consequently the quality of print is lowered. Therefore, in general, a printer is provided with a sensor (not shown) for detecting lateral slip of the photosensitive belt 25, and a steering device which corrects the lateral slip by slanting at least one of the rollers 21, 22 and 23 with respect to the others based on the signal from the sensor. Such a steering device is known in the field of the art, those of various configurations are presently used, and an example of those is disclosed in U.S. Pat. No. 5,479,241.

In such a printer, when the performance of the photosensitive belt 25 looped around the rollers 21, 22 and 23 deteriorates, the photosensitive belt 25 must be removed from the rollers 21, 22 and 23 through the belt passage 11 of the frame 10 so that it can be replaced with a new one.

In removing the photosensitive belt 25 from the rollers 21, 22 and 23, any one roller 21 is moved toward the other rollers 22 and 23 as shown by the imaginary line in FIG. 1 so that the tension applied to the photosensitive belt 25 for smooth circulation of the photosensitive belt 25 can be removed, and the photosensitive belt 25 can be freed from the rollers 21, 22 and 23. After the roller 21 is moved to the position shown in phantom in FIG. I and the tension of the photosensitive belt 25 is relieved, the photosensitive belt 25 looped around the rollers 21, 22 and 23 is removed from the rollers 21, 22 and 23 through the belt passage 11 of the frame 10. When a new photosensitive belt is looped around the rollers 21, 22 and 23, the roller 21 is moved back to the position shown by the solid line in FIG. 1, and applies tension to the new photosensitive belt 25.

However, in the above-described method, since the space between the belt passage 11 and the belt unit 20 is very narrow, it is difficult for a worker to directly remove the photosensitive belt 25 by inserting a hand through the belt passage 11, and, in addition, since the rollers 21, 22 and 23 are heated to a high temperature, the worker may suffer a burn while removing the photosensitive belt 25 from the rollers 21, 22 and 23.

In view of the above, a belt receiving cartridge is used to insert the belt into the belt passage by first receiving the belt in the belt receiving cartridge, and then to cause the belt to be removed through the belt passage by taking out the belt receiving cartridge, or to remove the photosensitive belt from the rollers by using a separate removing means. However, in the method using the belt receiving cartridge or the separate removing means as described above, there is a problem in that the belt removal is complicated. In addition, there is a problem in that when the belt receiving cartridge or the separate removing means is inserted into or removed from the frame through the belt passage, the belt receiving cartridge or the separate removing means may touch and damage the rollers.

SUMMARY OF THE INVENTION

To solve the above problems, it is an objective of the present invention to provide a method of removing a photosensitive belt of a printing apparatus from rollers, which is improved so that the photosensitive belt can be easily removed from the rollers without causing damage to the rollers even when a separate removing means is not used.

Accordingly, to achieve the above objective, there is provided a method of removing a photosensitive belt of a printing apparatus by removing the photosensitive belt, which is looped and circulating around a plurality of rollers in a tensioned state in the printing apparatus, through a belt passage provided at the frame of a printing apparatus including the steps of: circulating the photosensitive belt with at least one roller slanted with respect to the other rollers so that the photosensitive belt moves laterally in a lengthwise direction of the rollers and a portion part of the photosensitive belt is projected through the belt passage; and removing the photosensitive belt completely from the rollers by pulling the portion of the photosensitive belt which is projected through the belt passage.

BRIEF DESCRIPTION OF THE DRAWINGS

The above objective and advantages of the present invention will become more apparent by describing in detail a preferred embodiment thereof with reference to the attached drawings, in which.

DETAILED DESCRIPTION OF THE PREFERRED EMBODIMENT

Figure 1:
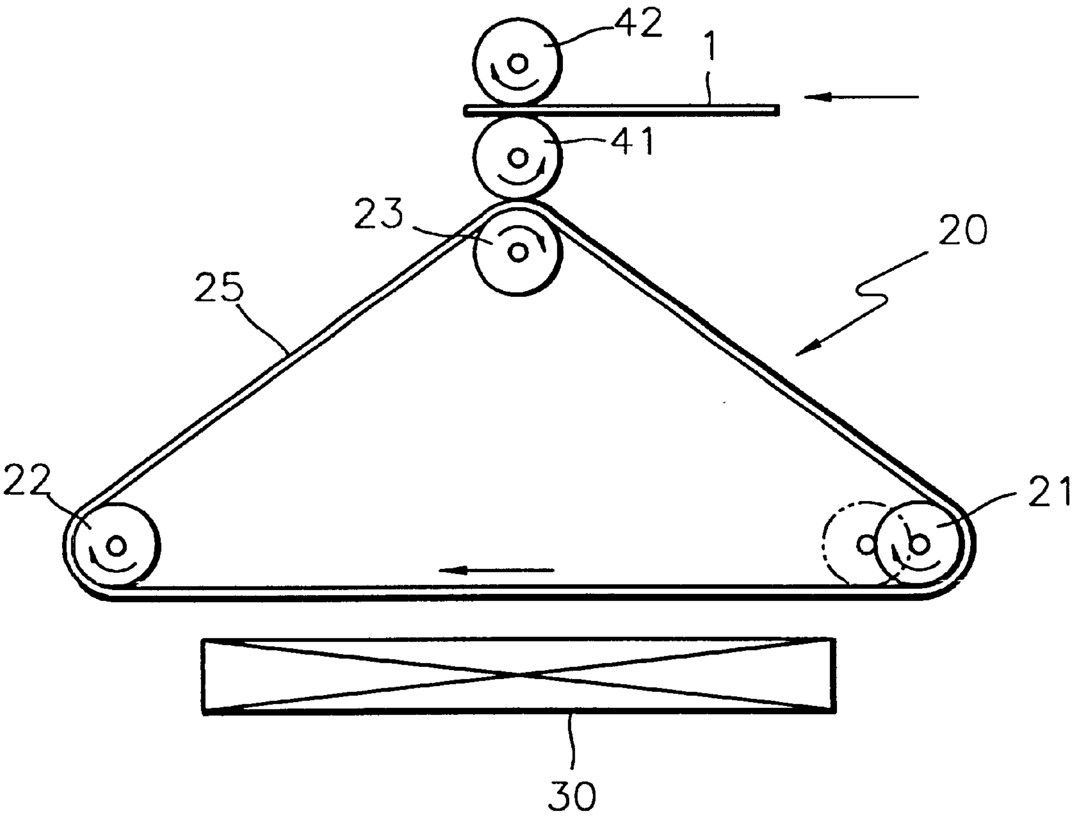
FIG. 1 diagram illustrating the schematic structure of essential portions of a general apparatus.
Figure 2:
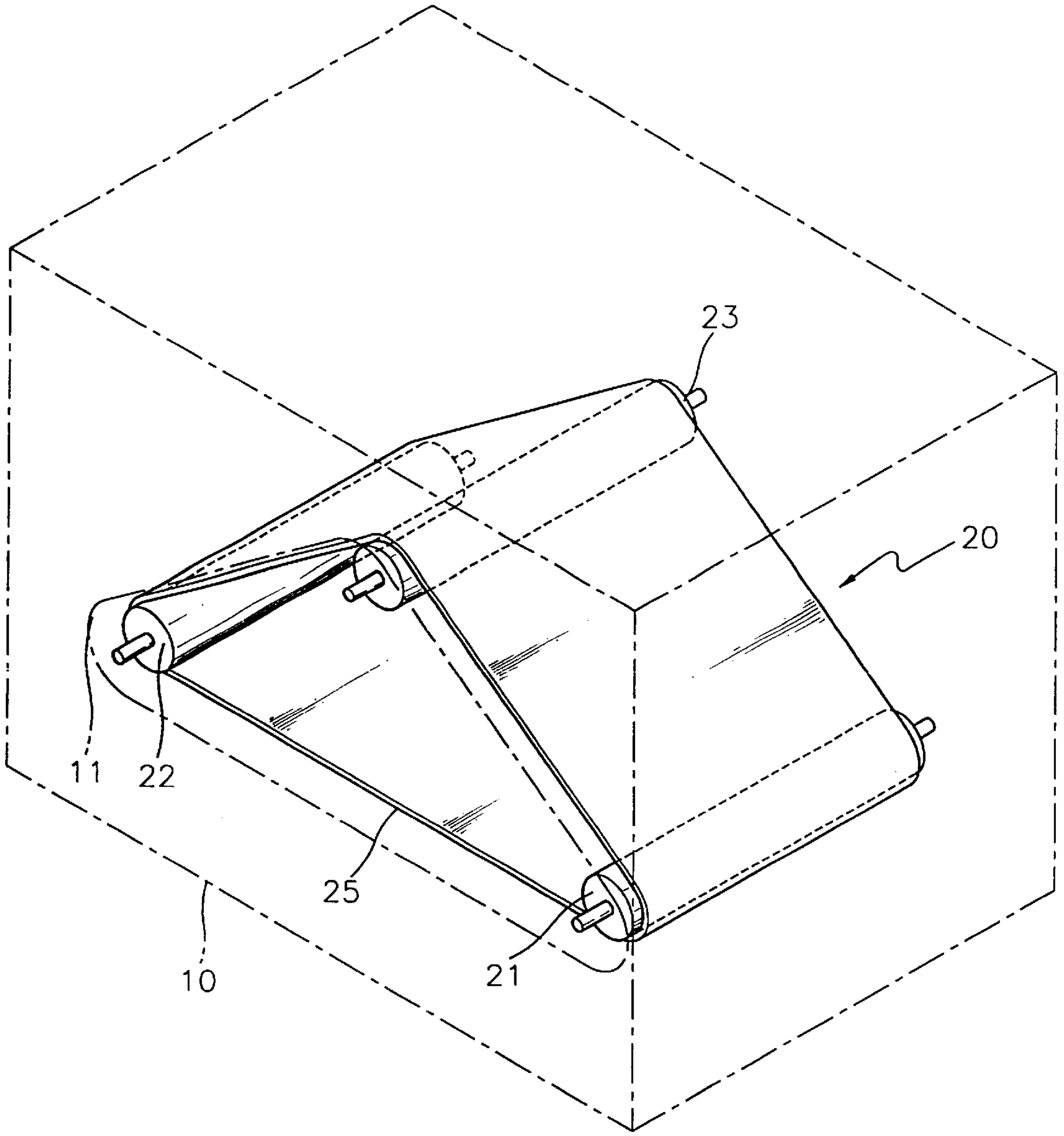
FIG. 2 is schematic perspective view illustrating a belt assembly portion shown in FIG.

As shown in FIGS. 1 and 2, when a photosensitive belt 25 which is looped and circulated around a plurality of rollers 21, 22 and 23 in a tensioned state is replaced with a new one, first, the photosensitive belt 25 must be stripped from the rollers 21, 22 and 23 and be removed through a belt passage 11 provided at a frame 10 of a printing apparatus.

Figure 3:
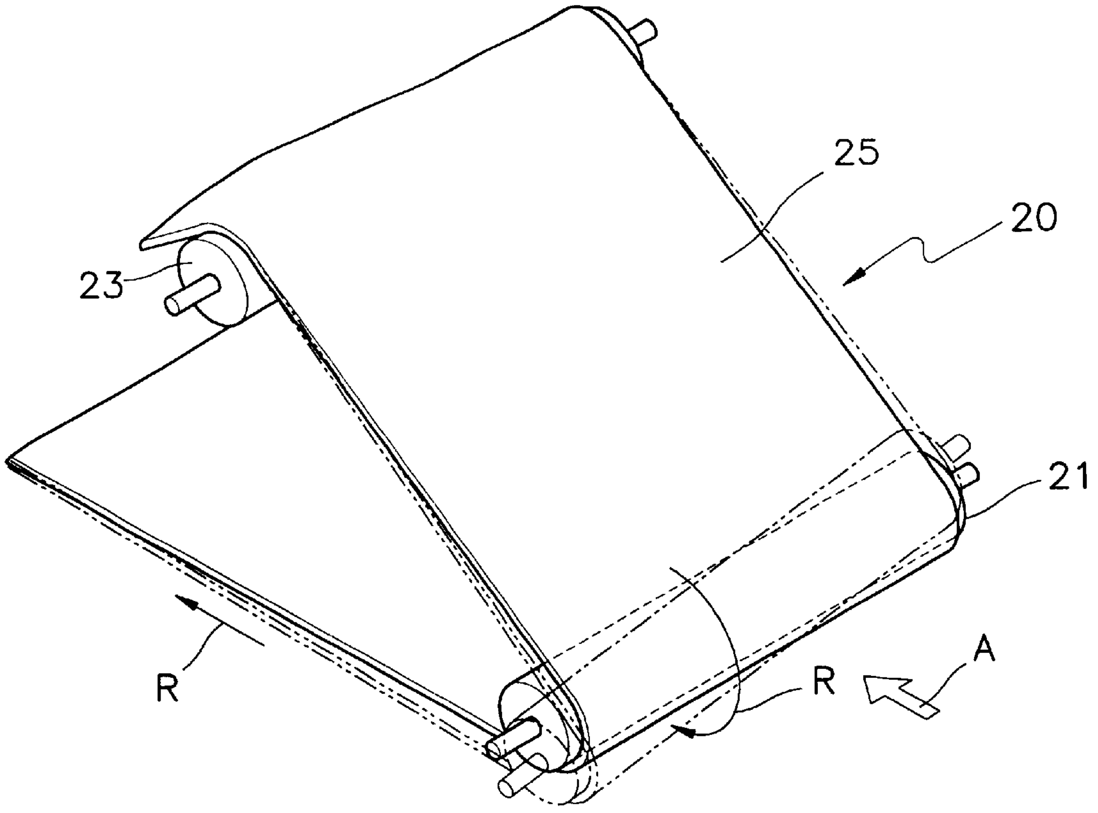
FIG. 3 is an expanded perspective view schematically illustrating essential portions in a state which one of the rollers shown in FIG. 2 is slanted so as to perform a method of the present invention.

When removing the photosensitive belt as described above, first the roller 21 is slanted with respect to the others 22 and 23 from a state shown in the solid line in FIG. 3 to a state shown by the imaginary line in FIG. 3. To slant the roller 21 is simply performed by a steering device usually provided in a printing apparatus so as to prevent lateral slip of the photosensitive belt 25 as described previously, and the steering device will be briefly described with reference to FIG. 4 structurally showing an example of the steering device.

Figure 4:
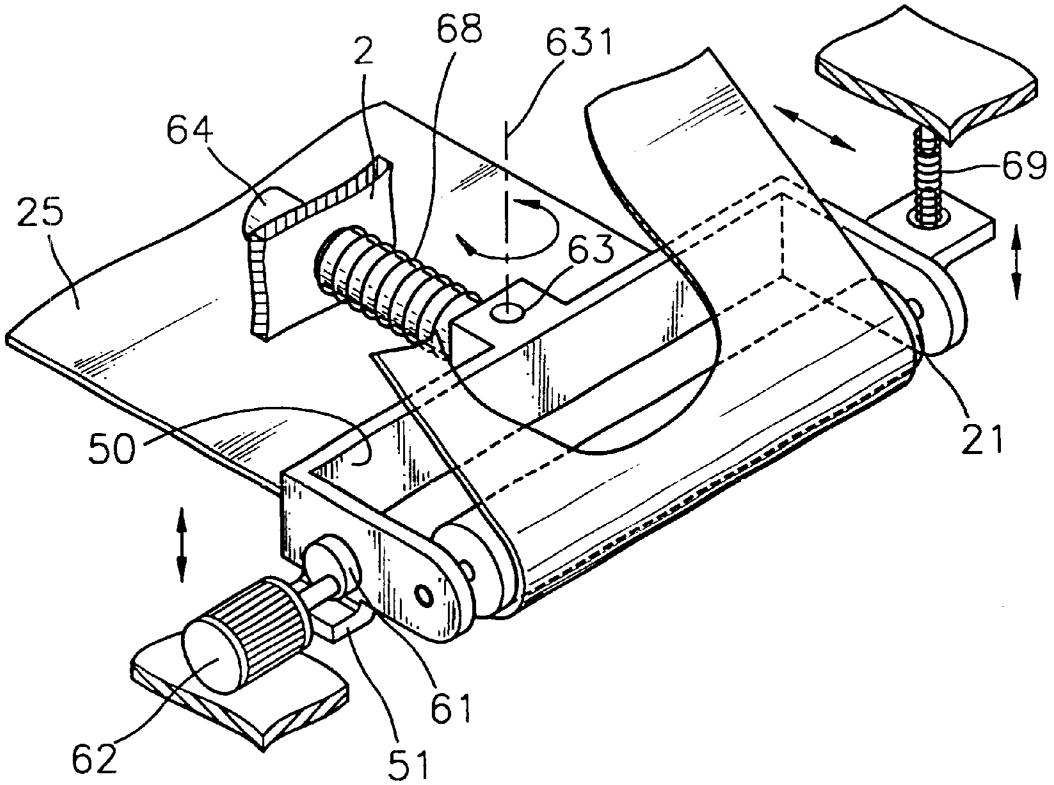
FIG. 4 is a perspective view illustrating a steering device for slanting the roller as shown in FIG. 3.

The steering device shown in FIG. 4 comprises a supporting body 50 supporting the roller 21 and having a cam contacting surface 51, a shaft 64 whose one end is joined to the supporting body 50 by a hinge shaft 63 and whose other end is joined to the frame 10 or a predetermined fixing body 2 so as to be rotatable and movable in the axial direction, a cam 61 contacting the cam contacting surface 51 and being rotatable by a motor 62, and a spring 69 for providing an elastic force to the supporting body 50 so that the cam contacting surface 51 can always closely contact the cam 61.

In such a steering device, when a minute difference in tension occurs at both edges of the traveling photosensitive belt 25, the supporting body 50 slightly rotates around the center line 631 of the hinge shaft 63 in a direction compensating for the tensional difference, and therefore, lateral slip of the photosensitive belt 25 due to a minute difference in tension can be prevented. On the other hand, when the overall tension of the photosensitive belt 25 is too large, the supporting body 50 and the shaft 64 joined to the supporting body 50 move toward the fixing body 2 while pressing a spring 68, and therefore the tension of the photosensitive belt 25 is reduced as a whole. Besides, when the overall tension of the photosensitive belt 25 is small, the supporting body 50 and the shaft 64 joined to the supporting body 50 move away from the fixing body 2 by the restoring force of the spring 68, and therefore the tension of the photosensitive belt 25 is increased as a whole.

In addition, when the tensional difference at both edges of the photosensitive belt 25 is large, a sensor (not shown) senses the difference, and the motor 62 is operated depending on the signal from the sensor and rotates the cam 61. The supporting body 50 rotates around the center line of the shaft 64 together with the shaft 64 with respect to the fixing body 2 in a direction to which the end portion of the supporting body 50 is raised or lowered according to the rotation direction of the cam 61.

Accordingly, the roller 21 can be slanted to a state shown by the imaginary line in FIG. 3 by the rotation of the cam 61.

Figure 5:
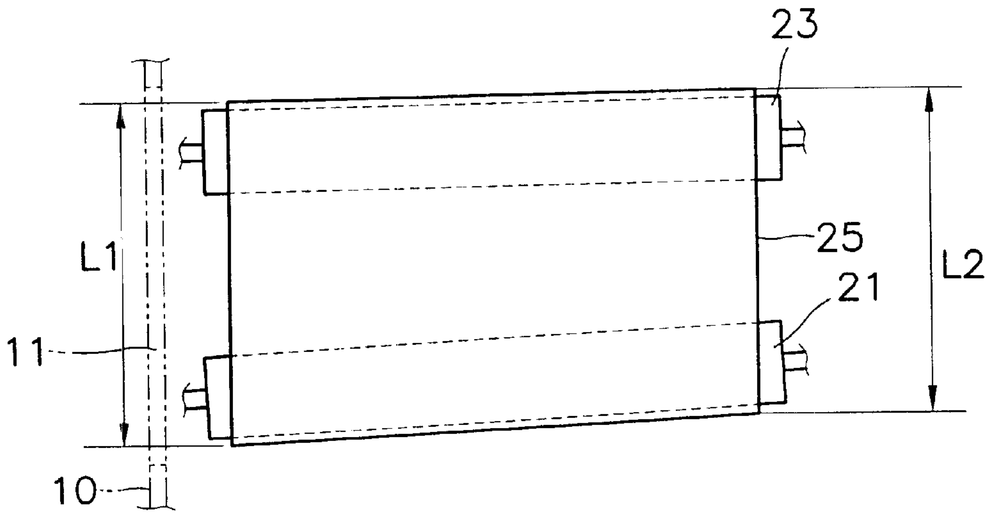
FIG. 5 is a diagram illustrating the essential portion of FIG. 3 shown from the perspective in the direction indicated by arrow "A"
Figure 6:
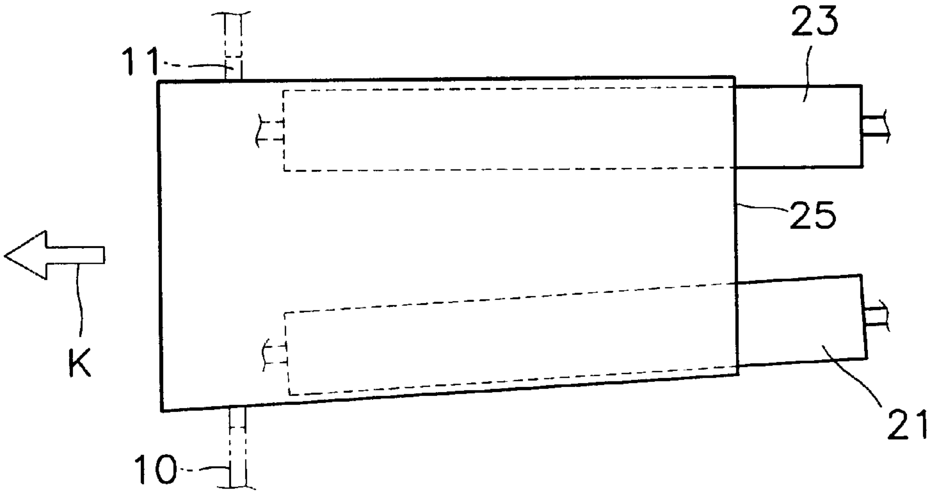
FIG. 6 is a diagram illustrating a state in which part of the photosensitive belt shown in FIG. 5 is projected through a belt passage of a frame.

When the roller 21 is slanted as described above, in the lengthwise direction of the photosensitive belt 25 between the roller 21 and the roller 23, the distance L1 of the edge portion close to the belt passage 11 of the frame 10 is longer than the distance L2 of the edge portion far from the belt passage 11 as shown in FIG. 5. Accordingly, when the photosensitive belt 25 travels in the direction of arrow R (refer to FIG. 3), the tension acting on the photosensitive belt 25 at the edge close to the belt passage 11 is larger than that at the edge far from the belt passage 11. Therefore, when the photosensitive belt 25 continues to travel in such a state, since the traveling photosensitive belt 25 tends to move in a direction increasing the tension thereof, the photosensitive belt 25 moves toward the belt passage 11 along a lengthwise direction of the rollers 21, 22 and 23 as shown in FIG. 6. Consequently, part of the photosensitive belt 25 projects out through the belt passage 11.

Then, when the worker pulls the projected portion of the photosensitive belt 25 projected through the belt passage 11 in the direction of arrow K as shown in FIG. 6, the photosensitive belt 25 is completely freed from the rollers 21, 22 and 23.

According to such a method, since a worker need not insert his hand into the belt passage 11 so as to remove the photosensitive belt 25 looped around the rollers 21, 22 and 23 in a tensioned state from the rollers 21, 22 and 23, that the worker suffers a burn by the rollers 21, 22 and 23 is basically prevented. In addition, since the belt receiving cartridge or a separate removing means need not be used, the removing job of the photosensitive belt 25 can be easily performed, and damage to parts due to undesirable contact between the belt receiving cartridge or a separate removing means and rollers and the like within the printing apparatus can be prevented as well.

On the other hand, in a state in which part of the photosensitive belt 25 looped around the rollers 21, 22 and 23 projects through the belt passage 11 of the frame 10, when the circulation of the photosensitive belt is stopped and the tension acting on the photosensitive belt is completely removed before the worker pulls the projected portion of the photosensitive belt 25 out from the rollers 21, 22 and 23, the worker can easily separate the photosensitive belt 25 from the rollers 21, 22 and 23.

For example, in the case that the printer is provided with the steering device shown in FIG. 4, when the fixing body 2, supporting body 50, shaft 64 and other parts are moved by a predetermined driving means toward the roller 22 (please refer to FIG. 2), the roller 21 supported by the supporting body 50 is moved to the position shown by the imaginary line in FIG. 1, and the tension of the photosensitive belt 25 is completely removed.

In the method of removing the photosensitive belt according to this embodiment, even though it has been described and is shown that the photosensitive belt travels with only one roller 21 slanted, two or more rollers may be slanted depending on the situation. In addition, it is not necessary to employ only the steering device having the structure shown in FIG. 4, a steering device of various configurations and structures provided in an existing printing apparatus may be utilized in performing the method of the present invention.

As described above, in the method of removing a photosensitive belt for a printing apparatus according to the present invention, since the photosensitive belt is circulated with at least one roller slanted with respect to the others so that the photosensitive belt moves in a lengthwise direction of the rollers and part of the photosensitive belt is projected through the belt passage, and then the photosensitive belt is removed by pulling the portion projected through the belt passage, the worker can remove the photosensitive belt without a separate removing means and damage to parts in the printing apparatus and an accident due to carelessness can be fundamentally prevented.

What is claimed is:

1. A method of removing a photosensitive belt of a printing apparatus by removing the photosensitive belt, which is looped and circulating around a plurality of rollers in a tensioned state in the printing apparatus, through a belt passage provided at a frame of the printing apparatus, said method comprising the steps of:

circulating the photosensitive belt with at least one roller slanted with respect to other of the rollers so that the photosensitive belt moves laterally in a lengthwise direction of the rollers and a portion of the photosensitive belt is projected out through the belt passage; and removing the photosensitive belt completely from the rollers by pulling the portion of the photosensitive belt which is projected out through the belt passage.

2. The method of removing a photosensitive belt of a printing apparatus as claimed in claim 1, wherein the method further comprises, between the circulating step and the removing step, stopping the circulation of the photosensitive belt and relieving the tension acting on the photosensitive belt.

* * * * *